United States Patent
O'Donoghue

(10) Patent No.: US 7,506,799 B2
(45) Date of Patent: Mar. 24, 2009

(54) METHOD FOR THE MONITORING OF SYSTEM SECURITY IN ELECTRONIC DEVICES

(75) Inventor: Niall O'Donoghue, Narva (FI)

(73) Assignee: Nokia Corporation, Espoo (FI)

( * ) Notice: Subject to any disclaimer, the term of this patent is extended or adjusted under 35 U.S.C. 154(b) by 401 days.

(21) Appl. No.: 10/903,251

(22) Filed: Jul. 30, 2004

(65) Prior Publication Data

US 2006/0026676 A1    Feb. 2, 2006

(51) Int. Cl.
*G06F 17/00* (2006.01)
(52) U.S. Cl. .................................. 235/375; 235/380
(58) Field of Classification Search ............. 235/375, 235/379, 380, 382, 492, 493
See application file for complete search history.

(56) References Cited

U.S. PATENT DOCUMENTS

| | | | | |
|---|---|---|---|---|
| 4,868,376 A | * | 9/1989 | Lessin et al. ............ | 235/492 |
| 4,926,388 A | * | 5/1990 | Kunita et al. ............ | 365/244 |
| 5,565,857 A | * | 10/1996 | Lee ....................... | 340/5.42 |
| 6,398,105 B2 | * | 6/2002 | Ramberg et al. ......... | 235/375 |
| 6,852,031 B1 | * | 2/2005 | Rowe ..................... | 463/29 |
| 7,044,395 B1 | * | 5/2006 | Davis et al. ............. | 235/494 |
| 2002/0133462 A1 | | 9/2002 | Shteyn .................... | 705/44 |
| 2003/0084321 A1 | | 5/2003 | Tarquini et al. ......... | 713/200 |
| 2004/0010579 A1 | | 1/2004 | Freese .................... | 709/223 |
| 2004/0123153 A1 | | 6/2004 | Wright et al. ........... | 713/201 |

* cited by examiner

*Primary Examiner*—Kumiko C Koyama

(57) ABSTRACT

A method, an electronic device and a computer program, for the monitoring of system security in an electronic device. In the method a security monitoring entity initiation event provided by a user is detected. Security information on at least one application process executing in the electronic device is gathered. The security information is presented on a display in the electronic device. After the presentation of the security information, the user is, for example, allowed to select at least one of the at least one application process and the at least one of the at least one application process is terminated.

21 Claims, 3 Drawing Sheets

METHOD FOR THE MONITORING OF SYSTEM SECURITY IN ELECTRONIC DEVICES

BACKGROUND OF THE INVENTION

1. Field of the Invention

The invention relates to system security in computing equipment used in data communication. Particularly, the invention relates to the monitoring of information relevant for system security in electronic devices.

2. Description of the Related Art

Nowadays security is becoming more and more of a hot topic in all computer communications. Most operating systems and application environments have proven to be vulnerable for a variety of attacks. An important type of attack is the so called system hijack situations where a malicious software component or application, in other words a Trojan horse, abuses the system. The most common abuse scenarios include information stealing, engaging in unauthorized commercial transactions on behalf of the system user and using the system for distribution of junk E-mail and so on. Previously mobile phones have largely been outside the threat of such attacks, but since the introduction of more versatile application environments making the mobile phones equivalent to portable computers some kind of abuse scenarios have ineluctably also made their way to mobile phones.

Such measures as secure protocols, anti-virus applications and firewalls have been introduced to mitigate the problem associated with malicious software. Despite these measures systems are still being hijacked. Even if systems in fact were secure in the end users are still left in doubt as to the present security status of their computers. In present day systems there is little possibility for users to actually verify and monitor the security relevant activities going on in their systems. For example, Microsoft WINDOWS™ provides a task manager function for presenting the applications currently running in the system. However, in the task manager there is no information as to the trust of applications and whether or not they are engaged in data communication activity.

SUMMARY OF THE INVENTION

The invention relates to a method for the monitoring of system security in an electronic device. In the method a security monitoring entity initiation event provided by a user is detected; security information on at least one application process executing in the electronic device is gathered; and the security information is presented on a display in the electronic device.

The invention relates also to an electronic device comprising: a memory to store at least a security monitor entity and at least one application process; a display to show a security monitor dialog; a keypad; a processor coupled to the memory, the display and the keypad, wherein the processor is configured to detect a security monitoring entity initiation event provided by a user, to gather security information on the at least one application process executing in the electronic device, and to present the security information on the display.

The invention relates also to a computer program comprising code adapted to perform the following steps when executed on a data-processing system: detecting a security monitoring entity initiation event provided by a user; gathering security information on at least one application process executing in the electronic device; presenting the security information on a display in the electronic device.

In one embodiment of the invention, the user is allowed to select at least one of the at least one application process. Thereupon, the at least one of the at least one application process is terminated.

In one embodiment of the invention, the processor is further configured to allow the user to select at least one of the at least one application process, and to terminate the at least one of the at least one application process.

In one embodiment of the invention, the security monitoring entity initiation event, in other words invocation event, is a predetermined sequence of key presses on the electronic device keypad. In one embodiment of the invention, the sequence of key presses comprises the keys corresponding to characters T, R, U, S and T on a keypad associated with the electronic device. The keys corresponding to characters T, R, U, S and T are 8, 7, 8, 7 and 8, respectively. The sequence of key presses is further started with characters * and # and terminated with #, thereby making the entire sequence to spell "*#87878#". The benefit of the key sequences mentioned is that they are in line with features codes already in use. For example, feature codes *#0000# and *#06# have been used to present reliable information on the software version and the serial number of user equipments. A further benefit is that the feature code spelling "*#87878#" may be entered using just one hand.

In one embodiment of the invention, the security monitoring entity initiation event is the selection of a menu function in the electronic device user interface. In one embodiment of the invention, the security monitoring entity initiation event is the press of a programmable function key on the electronic device.

In one embodiment of the invention, the security monitoring entity initiation event is a predetermined voice command. In order to recognize the voice command predefined speech sample data has been stored into the electronic device memory. The speech sample data provides the characteristics of the voice command for the initiation of security monitoring entity. The voice instructions uttered by the user are compared to the speech sample data in order to determine whether the command has been uttered.

In one embodiment of the invention, the security monitoring entity initiation event is a predetermined drawing gesture or symbol, which is recognized from a touch sensitive display when a user draws it on the display using, for example, a stylus or his finger.

In one embodiment of the invention, the security information comprises at least the trust status of the at least one application process. The trust status indicates whether the application process is secure or not. The trust status depends on, for example, whether or not the application program code, based on which the application process is invoked, has been signed by a trusted entity. Examples of such trusted entities are the network operator or a service provider. The signature of the trusted entity may further be verified using certificates.

In one embodiment of the invention, the security information comprises information on the data communication activity of the at least one application process. The information on data communication activity provides, for example, information related to network addresses, domain names and ports with which the at least one application process is communicating. In one embodiment of the invention, the data communication activity comprises the ports used locally by the at least one application process.

In one embodiment of the invention, the security information comprises the security of communications engaged in by the at least one application process. The security of communications engaged in depends, for example, on such factors as whether the peer communicated with have been authenticated and whether secure communication protocols are used for the communication. Examples of secure communication protocols are Secure Sockets Layer and Transport Layer Security (TLS).

In one embodiment of the invention, the security monitoring entity is an application within the electronic device. In one embodiment of the invention, the security monitor is part of another application or part of operating system within the electronic device.

In one embodiment of the invention, the electronic device is a SYMBIAN™ operating system device. The electronic device may, for example, be a General Packet Radio Service (GPRS) terminal or a Universal Mobile Telecommunications (UMTS) terminal.

In one embodiment of the invention the computer has a graphical user interface and the security monitor dialog is presented using at least one window. The graphical user interface may be based on, for example, SYMBIAN™ operating system or some other operating system. In one embodiment of the invention the security monitor dialog is character based.

In one embodiment of the invention, the computer program is stored on a computer readable medium. The computer readable medium may be a removable memory card, magnetic disk, optical disk or magnetic tape.

In one embodiment of the invention, the electronic device is a mobile device, for example, a laptop computer, palmtop computer, mobile terminal or a personal digital assistant (PDA). In one embodiment of the invention the electronic device is a desktop computer or any other computing device. In one embodiment of the invention the mobile device has a numeric keypad.

The benefits of the invention are related to the improved security in an electronic device and improved user trust on the applications executed in the electronic device. A further benefit of the invention is the avoiding of additional hardware such as Light Emitting Diodes (LED) for the presenting of application or system security status. Users are typically observing the display and not out of display indicators such as LEDs. A further benefit or the invention is that by having a complete up-to-date the security monitor window comprising detailed information, the falsifying of the user interface becomes more difficult for hackers. If just simple icons or symbols are shown in association with windows to indicate security status, the falsification of the user interface becomes much easier.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 1:
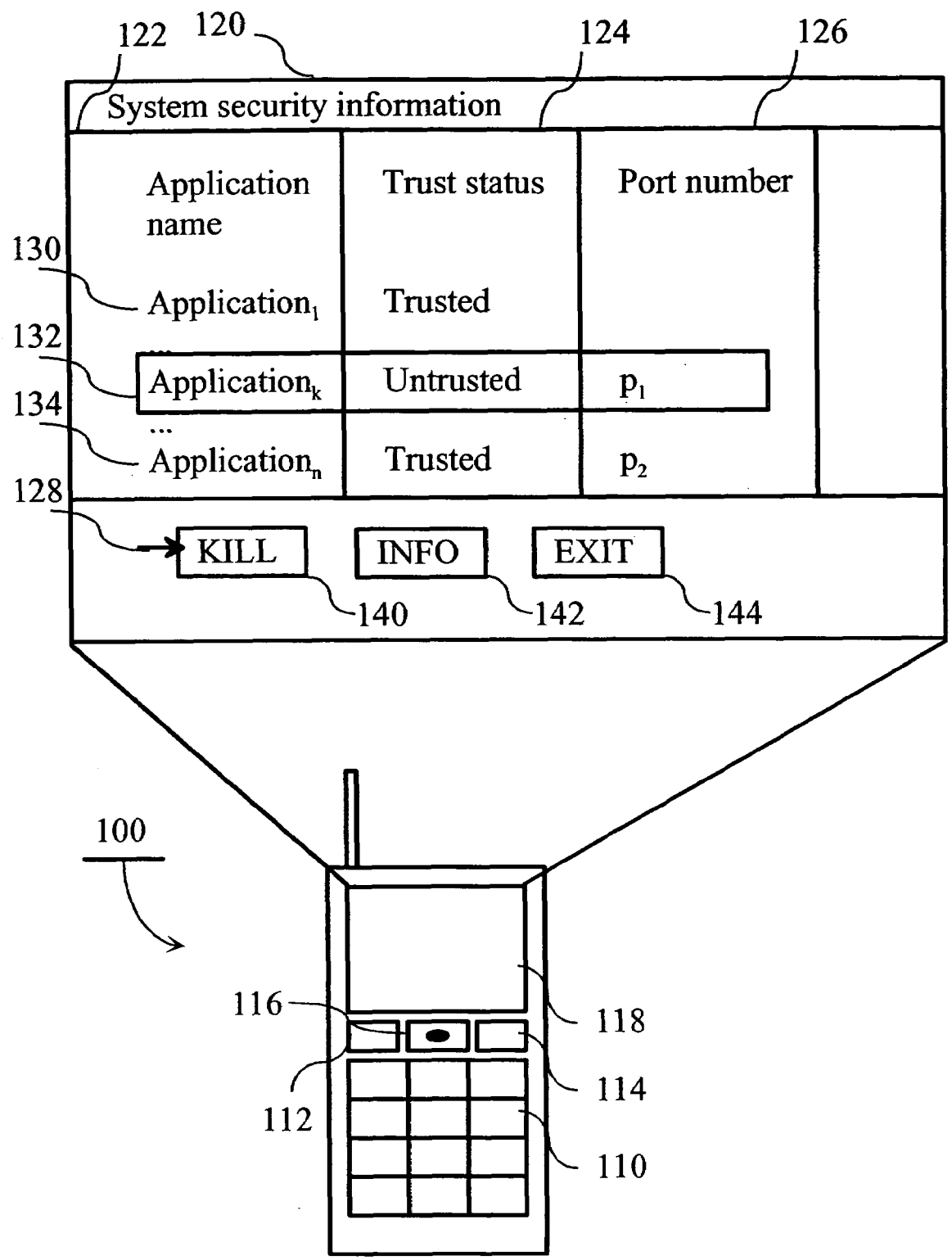
FIG. 1 is a block diagram illustrating the operation of an electronic device according to the invention.

FIG. 1 illustrates the operation of an electronic device according to the invention. An electronic device 100 comprises a display 118, a keypad 110, programmable function keys 112-114 and a pointer device 116. The display may be, for example, an LCD display. In one embodiment of the invention, the electronic device has a standard QWERTY-keyboard or any other keyboard where there are separate keys for most letters and a larger display. In one embodiment of the invention, the electronic device also comprises a second keyboard and a second display in a manner similar to, for example, Nokia Communicator™ 9210i.

Figure 2:
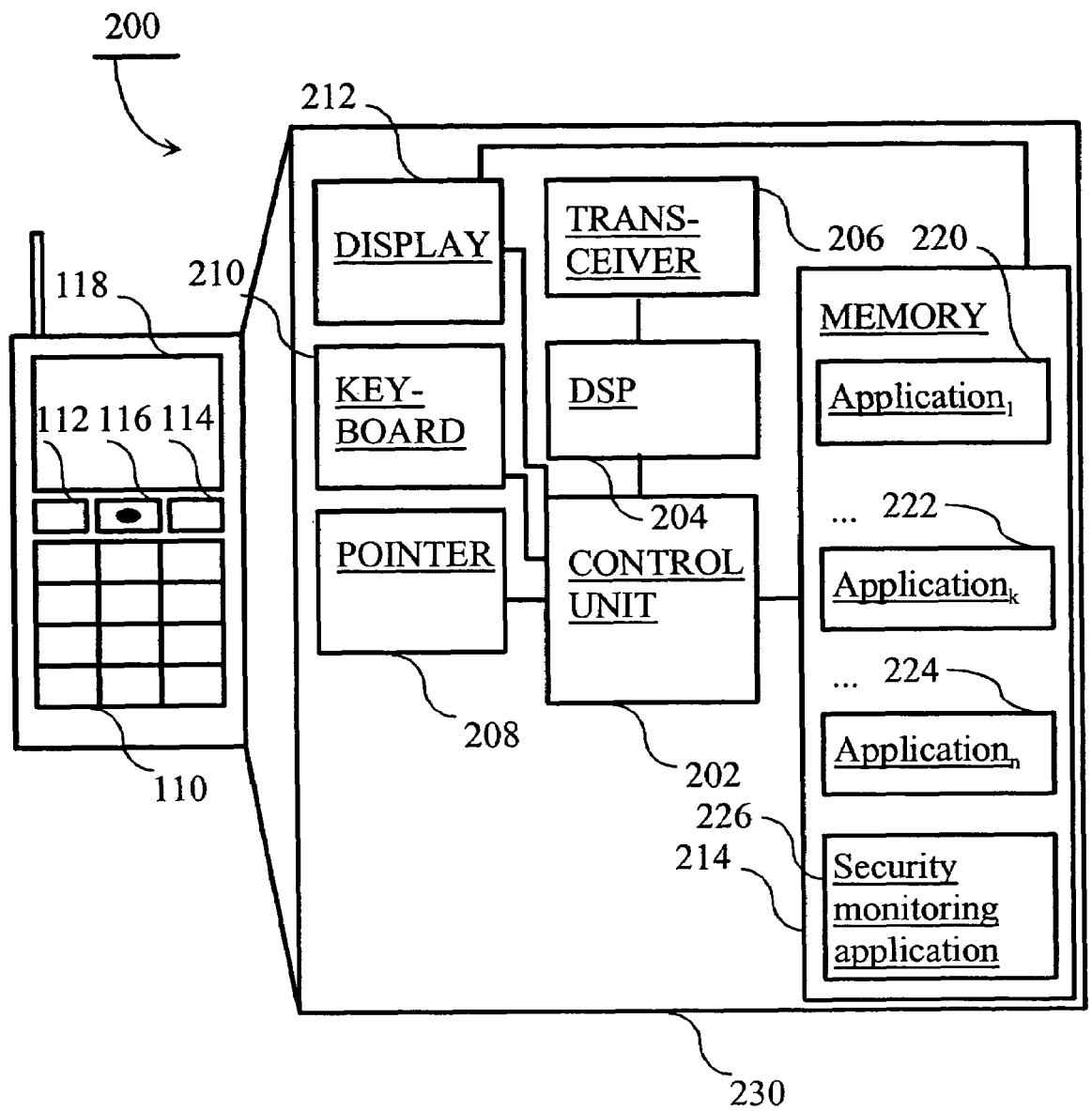
FIG. 2 is a block diagram illustrating the software and hardware architecture of an electronic device according to the invention.

FIG. 2 is a block diagram illustrating the software and hardware architecture of an electronic device according to the invention. The box 230 represents the internal components of electronic device 100. Electronic device 100 has a control unit 202, display controller circuit 212, keyboard controller circuit 210, a pointer device controller circuit 208, a radio transceiver 206 and a DSP unit 204. The control unit 202 is connected to a central memory 214. Central memory 214 is read also from display controller circuit 212. In central memory 214 is stored a security monitor application 226 at least when it is being executed. In central memory are also stored processes 220-224, which represent three different executing applications, named application$_1$, application$_k$ and application$_n$. It should be noted that in central memory 214 there might be any number of processes. Processes 220-224 are just presented for illustrative purposes. They are examples of applications executed by control unit 202.

Figure 3:
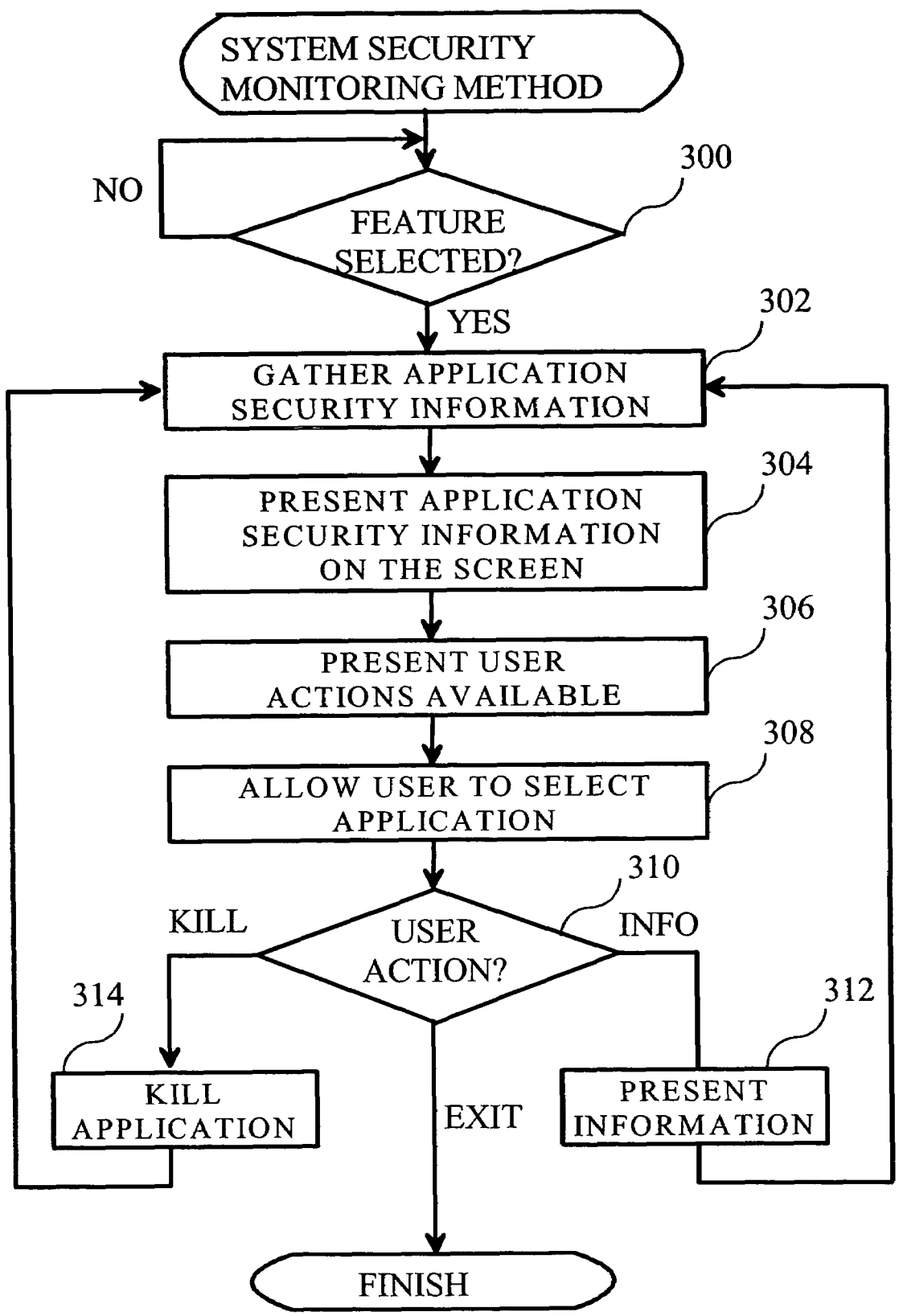
FIG. 3 is a flow chart depicting one embodiment of a method for the monitoring of system security in electronic devices.

FIG. 3 is a flow chart depicting one embodiment of a method for the monitoring of system security in electronic devices such as electronic device 100 in FIG. 1. The software and hardware architecture is as illustrated in FIG. 2.

At step 300 electronic device 100 waits for a user interaction event. If the user interaction event indicates that security monitoring application 226 is to be initiated, method continues at step 302. The user interaction event that indicates the starting of security monitor application may be, for example, the selection of a given menu function, the pressing of a given function key such as function keys 112-114 or a given sequence of keys on keypad 110. In one embodiment of the invention, the user interaction event is the sequence of keys *#87878#, which represents the characters *#TRUST# on the keypad 110. By entering the key sequence *#87878#, the user is able to start the security monitor application. The format of the key sequence complies with the feature codes standardized in the 3G Partnership Project (3GPP) specification 22.030 describing the Man-Machine Interface (MMI) of the User Equipment (UE). The format is also in line with feature codes *#0000# and *#06# that have been used to present reliable information on the software version and the serial number of user equipments.

At step 302 security monitoring application in 226 electronic device 100 gathers application information on application processes currently alive in the system. Such processes may be, for example, in an active state eligible for receiving CPU time by the scheduler, in a waiting state sleeping until woken up either by a timer or by another application, or in a blocked state trying to enter a synchronized section. The information about processes is obtained using operating system services. The gathered application information comprises security related information such as, for example, trust status, files open and sockets open. The trust status of a given process is determined, for example, by checking the existence of the digital signatures on the program code for the process. A service provider or a network operator has typically signed the program code. The trust status may have been determined as the process is initiated so that it is readily available in the process information stored by the operating system in central memory 214. From each socket open is determined the port number associated with the socket. A port in this context means, for example, a Transmission Control Protocol (TCP) or a Universal Datagram Protocol (UDP) port. In one embodiment of the invention, a lookup is performed, which maps the port number to the name of the protocol, for which the port is assigned or reserved by Internet Assigned Numbers Authority. The lookup is performed, for example, using a lookup file stored in electronic device 100. In one embodiment of the invention only a small subset of the assigned or reserved port numbers are mapped to protocol names by the electronic device. For files open, the complete file name is obtained and formed by security monitoring application 226. As illustrated in FIG. 2, security monitoring application 226 gathers information on processes 220, 222 and 224 that are instances of three different applications 130, 132 and 134 illustrated in FIG. 1, respectively.

At step 306 the application information gathered at step 304 on processes is presented to the user by security monitoring application 226. The application information is presented, for example, using a dialog window 120 illustrated in FIG. 1. Dialog window 120 comprises columns 122-126. Column 122 presents application names, column 124 the trust status and column 126 the port number. In one embodiment of the invention, the protocol name associated with the port number is also presented (not shown). In FIG. 1 there are shown three applications 130-134. The trust status of application 132 is untrusted, which means, for example, that it has not been signed digitally. The trust status of applications 130 and 134 is trusted, which means, for example, that a digital signature exists for these applications.

At step 306 user actions available are presented to the user. In one embodiment of the invention, the user actions available comprise "kill", for killing the application currently selected on dialog window 120, "info", for requesting more information about the currently selected application, and "exit" for closing dialog window 120. The user actions are made available for user selection by means of three buttons 140-144. In one embodiment of the invention, the user actions available are presented simultaneously with the presentation of application information. This is performed as dialog window 120 is presented on display 118.

At step 308 the user is allowed to browse the application list and change the currently selected application. The selecting of application is performed, for example, using pointer device 116. As the current application is selected, the user may choose one of the dialog buttons 140-144, for example, using pointer device 116. If the user chooses "kill" dialog button 140, currently selected application is killed at step 314 comprising at least that the processes for it is terminated in electronic device 100 operating system. In FIG. 1 application 132 is currently selected since it is highlighted on dialog window 120. The killing of application 132 results in the termination of corresponding process 222. If the user chooses "info" dialog button 142, more information on application currently selected is presented to the user at step 312. This information comprises, for example, the protocol names for the ports used by application, the files currently open and identities of remote entities associated with the ports. Similarly, information on the security status of the communications associated with the ports may be presented. The security of communications depends on, for example, whether or not secure protocols such as Secure Sockets Layer (SSL) are used for communicating over the port. Similarly, the communication over a port may be considered secure, if the other party reached via the port has been authenticated. Finally, if the user chooses dialog button 144, the security monitoring application exits.

It will be evident to a person skilled in the art that with the advancement of technology, the basic idea of the invention may be implemented in various ways. The invention and its embodiments are thus not limited to the examples described above; instead they may vary within the scope of the claims.

The invention claimed is:

1. A method, comprising:

detecting a user interface action in said electronic device;

initiating a security monitoring application in said electronic device in response to said user interface action;

gathering security information on at least a first application process among at least one application process executing in said electronic device to said security monitoring application, said security information comprising identification of a remote party with which said first application process is communicating, a port number or a protocol name for the protocol used by said first application process and a name of at least one file open in said first application process;

forming a security information list using said security information, said security information list comprising an entry for said first application process, said entry comprising a name of said first application process, said identification of said remote party, said port number or said protocol name and said name of the at least one file; and presenting said security information list on a display in said electronic device.

2. The method according to claim 1, the method further comprising:

allowing the user to select at least one of said at least one application process; and terminating said at least one of said at least one application process.

3. The method according to claim 1, wherein said security monitoring entity initiation event is a predetermined sequence of key presses.

4. The method according to claim 3, wherein said sequence of key presses comprises the keys corresponding to characters T, R, U, S and T on a keypad associated with the electronic device.

5. The method according to claim 1, wherein said security information comprises at least a trust status of said at least one application process.

6. The method according to claim 1, wherein said security information comprises data communication activity of said at least one application process.

7. The method according to claim 6, wherein said data communication activity comprises ports used.

8. The method according to claim 1, wherein said security information comprises security of communications engaged in by said at least one application process.

9. The method according to claim 1, wherein said electronic device is a mobile station.

10. An apparatus comprising:
a memory to store at least a security monitor application and at least one application process;
a display to show a security monitor dialog;
a keypad;
a processor coupled to the memory, the display and the keypad, wherein the processor is configured
to detect a user interface action,
to initiate a security monitoring application in said electronic device in response to said user interface action,
to gather security information on at least a first application process among said at least one application process executing in said electronic device to said security monitoring application, said security information comprising identification of a remote party with which said first application process is communicating, a port number or a protocol name for the protocol used by said first application process and a name of at least one file open in said first application process,
to form a security information list using said security information, said security information list comprising an entry for said first application process, said entry comprising a name of said first application process, said identification of said remote party. said port number or said protocol name and said name of the at least one file, and
to present said security information list on said display.

11. The apparatus according to claim 10, wherein the processor is further configured to allow the user to select at least one of said at least one application process, and to terminate said at least one of said at least one application process.

12. The apparatus according to claim 10, wherein said security monitoring entity initiation event is a predetermined sequence of key presses.

13. The apparatus according to claim 12, wherein said sequence of key presses comprises keys corresponding to characters T, R, U, S and T on the keypad.

14. The apparatus according to claim 10, wherein said security information comprises at least a trust status of said at least one application process.

15. The apparatus according to claim 10, wherein said security information comprises data communication activity of said at least one application process.

16. The apparatus according to claim 15, wherein said data communication activity comprises ports used.

17. The apparatus according to claim 10, wherein said security information comprises security of communications engaged in by said at least one application process.

18. The apparatus according to claim 10, wherein said electronic device is a mobile station.

19. A computer program embodied on a computer readable medium, the computer program comprising code for controlling a processor to execute a method comprising:
detecting a user interface action in an electronic device;
initiating a security monitoring application in response to said user interface action;
gathering security information on at least a first application process among at least one application process executing in said electronic device to said security monitoring application, said security information comprising identification of a remote party with which said first application process is communicating, a port number or a protocol name for the protocol used by said first application process and a name of at least one file open in said first application process;
forming a security information list using said security information, said security information list comprising an entry for said first application process, said entry comprising a name of said first application process, said identification of said remote party, said port number or said protocol name and said name of the at least one file; and
presenting said security information on a display in said electronic device.

20. The computer program according to claim 19, wherein said computer readable medium is a removable memory card.

21. The computer program according to claim 19, wherein said computer readable medium is a magnetic or an optical disk.

* * * * *